United States Patent
Niemann et al.

(10) Patent No.: US 9,850,792 B2
(45) Date of Patent: Dec. 26, 2017

(54) APPARATUS FOR DETERMINING A STABILIZED FILLING LEVEL WITH AN ANTECHAMBER AND CALMING STRUCTURE

(71) Applicant: Hella KGaA Hueck & Co., Lippstadt (DE)

(72) Inventors: Thomas Niemann, Delmenhorst (DE); Jurgen Palloks, Westerstede (DE)

(73) Assignee: Hella KGAA Hueck & Co., Lippstadt (DE)

( * ) Notice: Subject to any disclaimer, the term of this patent is extended or adjusted under 35 U.S.C. 154(b) by 93 days.

(21) Appl. No.: 14/502,678

(22) Filed: Sep. 30, 2014

(65) Prior Publication Data

US 2015/0090018 A1    Apr. 2, 2015

(30) Foreign Application Priority Data

Sep. 30, 2013   (DE) .................. 10 2013 016 164

(51) Int. Cl.
| | | |
|---|---|---|
| *G01F 23/46* | (2006.01) | |
| *F01M 11/12* | (2006.01) | |
| *G01F 23/296* | (2006.01) | |
| *F01M 11/06* | (2006.01) | |
| *F02D 1/00* | (2006.01) | |
| *G01F 23/00* | (2006.01) | |

(52) U.S. Cl.
CPC ............ *F01M 11/12* (2013.01); *F01M 11/06* (2013.01); *F02D 1/00* (2013.01); *G01F 23/0046* (2013.01); *G01F 23/2962* (2013.01)

(58) Field of Classification Search
CPC .......... F01M 11/22; F01M 11/06; F02D 1/00; G01F 23/2962; G01F 23/0046; F01D 1/00; B60K 36/00
USPC .................................................... 73/290
See application file for complete search history.

(56) References Cited

U.S. PATENT DOCUMENTS

| | | | | |
|---|---|---|---|---|
| 3,665,379 A | * | 5/1972 | Trott ................... | G01V 13/00 367/13 |
| 7,271,525 B2 | * | 9/2007 | Byers ................... | H03H 9/1021 310/330 |
| 2011/0226212 A1 | * | 9/2011 | Niemann .............. | F01M 11/12 123/196 R |

(Continued)

FOREIGN PATENT DOCUMENTS

| | | | |
|---|---|---|---|
| DE | 102009023211 A1 * | 12/2010 | ............ F01M 11/12 |
| DE | 102010011490 | 9/2011 | |

(Continued)

*Primary Examiner* — Natalie Huls
*Assistant Examiner* — Monica S Young
(74) *Attorney, Agent, or Firm* — Muncy, Geissler, Olds & Lowe, P.C.

(57) ABSTRACT

A device for determining a filling level of a container is provided, having a damping cup, a measuring section extending vertically inside the damping cup, and having an ultrasound converter arranged at its lower end region, and at least one antechamber. A calming structure is arranged in at least a part of at least one antechamber, to achieve as much degassing of the liquid as possible. The part of the antechamber having the calming structure is designed to be open towards the top over a large area and is connected, via a venting channel, with a vent in the upper region of the device.

10 Claims, 3 Drawing Sheets

(56) References Cited

U.S. PATENT DOCUMENTS

| | | | | |
|---|---|---|---|---|
| 2011/0228641 A1* | 9/2011 | Niemann | ............ | G01F 23/2962 |
| | | | | 367/99 |
| 2012/0234091 A1* | 9/2012 | Niemann | ............ | G01F 23/2962 |
| | | | | 73/290 V |
| 2013/0114379 A1* | 5/2013 | Fischer | ................ | G10K 11/165 |
| | | | | 367/189 |
| 2014/0338444 A1* | 11/2014 | Jaeger | ................... | F16N 19/003 |
| | | | | 73/290 V |
| 2015/0068301 A1* | 3/2015 | Ross, Jr. | ................. | G01F 23/68 |
| | | | | 73/313 |

FOREIGN PATENT DOCUMENTS

| | | | | |
|---|---|---|---|---|
| DE | 102011008585 | | 7/2012 | |
| DE | 102011087981 A1 * | | 6/2013 | ........... F16N 19/003 |
| WO | WO 2008009277 | | 1/2008 | |

\* cited by examiner

APPARATUS FOR DETERMINING A STABILIZED FILLING LEVEL WITH AN ANTECHAMBER AND CALMING STRUCTURE

BACKGROUND OF THE INVENTION

Field of the Invention

The invention relates to a device for determining a filling level of a container, comprising a damping cup, a measuring section extending vertically inside the damping cup and having an ultrasound converter arranged at its lower end region, and at least one antechamber, wherein a calming structure is arranged in at least a part of at least one antechamber.

Brief Description of the Related Art

Devices of this kind are known for example from the DE 10 2010 011 492 A1 and the DE 10 2008 027 969 A1. Oil levels in engines are usually checked using ultrasound sensors. These emit sound waves which are reflected at the boundary surface between two media such as air and oil (wherein instead of oil other liquids can also be measured) and received again by the ultrasound sensor. The filling level in the container which comprises the device, can be determined from the recorded travelling time of the sound waves. When the engine is running however, in particular in a motor vehicle, it is very difficult, if not impossible to determine the filling level of the oil, because the oil is in a foamed state and the sound waves are reflected from the gas bubbles in the oil.

In order to be able to evaluate the readings, an unequivocal boundary surface is required, between the media, i.e., between gas and oil. So-called damping cups are useful for this purpose. Within these damping cups, which have the measuring section of the ultrasound converter arranged in them, the liquid to be measured is calmed, and the only connection with the oil or other liquid to be measured is via a small opening in the damping cup. Only a few gas bubbles get into the damping cup through this small opening which links the damping cup with the container. The filling level in the damping cup corresponds to the filling level outside the damping cup. The oil which has previously passed through a calming structure where it has been degassed to a large extent, is received in an antechamber arranged between the liquid in the container and the actual measuring section. Therefore as the filling level changes largely bubble-free oil can flow from the antechamber into the measuring section.

SUMMARY OF THE INVENTION

The invention is based on the requirement to propose a device of the kind mentioned in the beginning which allows still more extensive degassing of the liquid which is being measured for its filling level. The solution to this requirement can be effected with a device with the characteristics of patent claim 1. Advantageous further developments of the invention are described in the sub-claims.

With a device for determining a filling level in a container comprising a damping cup, a measuring section extending vertically inside the damping cup which has an ultrasound converter arranged at its lower end region, and at least one antechamber, wherein a calming structure is arranged in at least a part of at least one antechamber, provision is made according to the invention that the part of the antechamber comprising the calming structure is designed to be open towards the top over a large area and is connected, via a venting channel, with a vent in the upper region of the device. This allows the calming structure to completely vent in upward direction. Large-area venting means that at its top the calming structure is open by more than 50% and any gas bubbles emerging in this entire region can escape in upward direction. Due to the rising filling pressure in the calming structure the lighter air bubbles can rise evenly upwards and escape. The calming structure is understood to be a geometric structure which slows down the velocity of the flow in the antechamber. There, are geometric structures in particular, which define a meander-shaped flow path with a plurality of windings. These windings are preferably smaller than the antechamber itself by at least a factor of 3, preferably by at least a factor of 5.

Preferably that part of the antechamber which comprises the calming structure is completely open towards the top. This part of the antechamber therefore comprises structures which are essentially vertically aligned. These are on the one hand, the turning point, and on the other the structures arranged in this part of the antechamber, which are arranged in such a way that a meander-shaped flow path is preferably defined for the liquid in the container. The only horizontally aligned structure is therefore preferably the floor region. In the preferred design this part of the antechamber is therefore "without a ceiling", i.e. completely open towards the top.

Preferably the antechamber is configured such that this comprises a first antechamber and a second antechamber. The first antechamber comprises an inlet opening and the calming structure. The second antechamber is connected with the first antechamber and the measuring section. The second antechamber is therefore arranged between the first antechamber and the measuring section and serves to receive degassed liquid which is then discharged, as required, into the measuring section.

In a preferred design of the invention the first antechamber surrounds the measuring section like a ring. On one side an inlet, opening is present and the opposite side an outlet opening is present. This outlet opening is preferably directed towards the second antechamber. In principle however, it is possible to construct a device which only comprises the first antechamber described here. In such a case the outlet opening would lead directly to the lower region of the measuring section. Insofar the first antechamber is constructed in a symmetric manner, and the inlet and outlet openings lie exactly opposite each other. The liquid therefore has no a preferred direction. This means that the flow passes through the entire volume of the first antechamber. The calming structure preferably comprises a star-shaped inner region and projections reaching from outside into the free regions of the star-shaped inner region. This leads to an altogether meander-like structure. The liquid alternates between flowing into the centre of the circular cross-section surface and again outwards in direction of the circumference. The star-shaped inner region preferably comprises between five and ten finger-like structures protruding outwards and respective projections protruding into the spaces there between. Preferably the outlet opening is arranged in a region between two outwardly protruding fingers. In this region there is no projection protruding from outside. Preferably the star-shaped inner region comprises an odd number of outwardly protruding fingers, wherein the inlet opening is directed exactly towards one of these fingers. On the opposite side the outlet opening is arranged between two fingers.

Preferably the venting channel surrounds the measuring section above the first antechamber like a ring. Preferably an outer wall is provided around the measuring section over the entire length, which in a lower part which preferably represents less than half the height, receives the first antechamber with the calming structure, and in the upper part which preferably represents more, than half the height of the measuring section, surrounds a venting channel which is annular in cross-section. In cross-section the device according to the invention, in the upper part, is thus preferably designed in the manner of a dual-wall pipe, wherein the measuring section is arranged in the inner pipe and the venting channel is formed between the two walls.

In another preferred embodiment of the invention—one also of autonomous inventive character, and usable without the above described invention with regard to the open-on-top calming structure—the upper end region of the measuring section of the damping cup is designed in a particular manner. The upper termination of the wall of the measuring section is preferably higher compared to a lower termination of an annular shield extending downwards from the top, which separates the wall of the measuring section from the vent, but it is also inventive in its own right. As a result, any foam entering the vent from outside is initially deflected towards the outside by the annular shield extending downwards from the top and does not penetrate into the measuring section the termination of which lies higher.

In its upper region the device preferably comprises a detachable cap comprising the vent. This cap is arranged on the measuring section which extends all the way into the cap. Preferably the measuring section is designed to narrow down in the upper region, i.e. within the cap.

In another preferred design of the invention the vent is directly connected with the venting channel. Any oil foam finding its way into the vent can run directly downwards and from there into the venting channel which due to the above-described design is quite voluminous thus serving as a reservoir for receiving any foam which might enter, and thus preventing it from entering the measuring section. Further there exists a receiving space below the vent which surrounds the wall of the measuring cup. The receiving space is present in particular in the region of the cap.

In another preferred design of the invention the measuring section is shaped like a truncated cone at its foot. This is the reason why bubbles cannot collect in, or adhere to, the region of the foot of the measuring section, nor at the transition between measuring section and antechamber. Due to the truncated cone design a plane is formed there which tapers towards the top, and gas bubbles run off towards the top and then outgas in that direction through the measuring section. The forming of air pockets is thus avoided.

Furthermore the invention relates to an engine, in particular a motor vehicle engine, and also a motor vehicle, which are characterised, respectively, in that they comprise the above-described device.

BRIEF DESCRIPTION OF THE DRAWINGS

The invention will now be explained in detail by way of a preferred embodiment shown in the drawing, in which the following details are schematically shown.

DETAILED DESCRIPTION OF THE PREFERRED EMBODIMENTS

Figure 1:
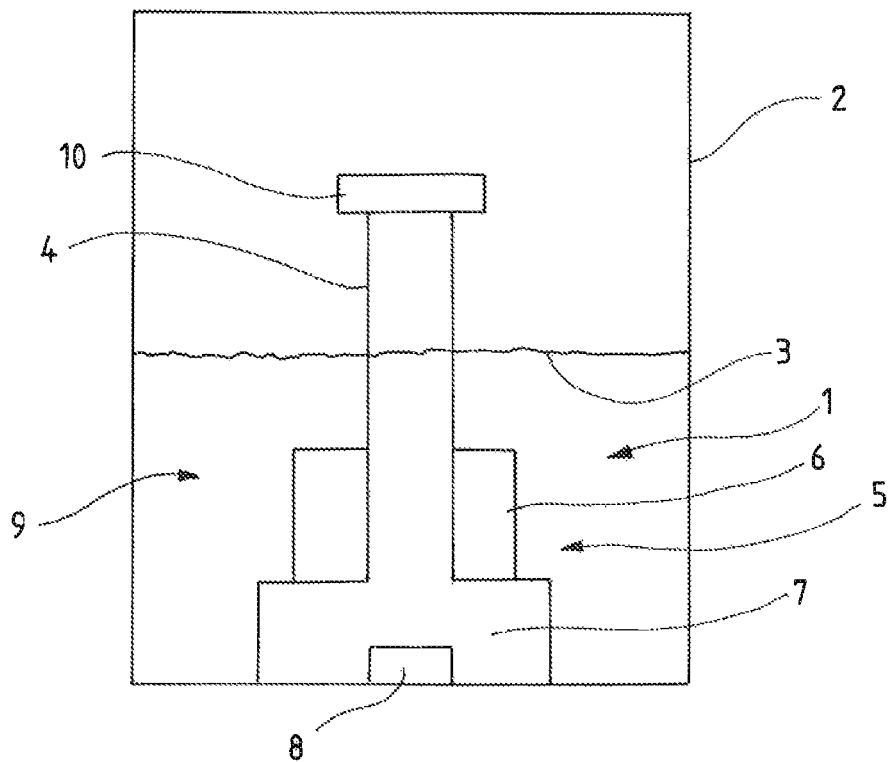
FIG. 1 shows a principal construction of a device according to the invention.

FIG. 1 represents a principal view of the elements of the device 1 according to the invention. The device 1 according to the invention is arranged in a container 2 for measuring the filling level 3 of a liquid in this container 2. The device 1 comprises an antechamber 5 which here consists of a first antechamber 6 and a second antechamber 7. An ultrasound converter 7 is arranged in the antechamber 5, here in the second antechamber 7, and this converter is arranged below a measuring section 4 extending vertically upwards and emits ultrasound waves in upward direction, which are reflected at the boundary surface formed by the filling level 3 between liquid and gas. Number 9 denotes a damping cup which here represents the essential part of the device 1. The damping cup 9 has a cap 10 fitted to it which closes the damping cup 9 at the top and which comprises a vent 12.

Figure 2:
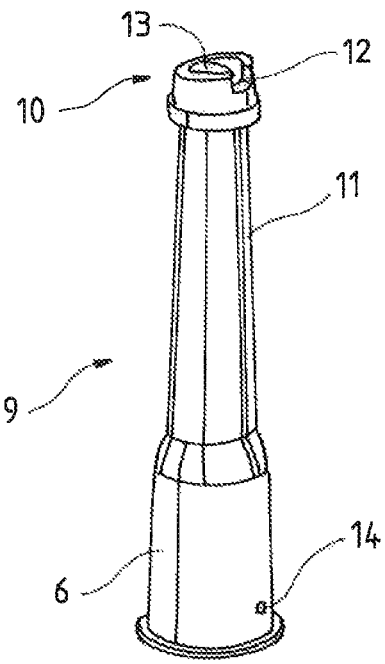
FIG. 2 shows a perspective view of a damping cup.

In FIG. 2 the damping cup 9 is shown in a perspective view. The second antechamber 7 is not shown here, but the cap 10 is. In the lower region of the damping cup 9 the first antechamber 6 can be recognised as a widened area. This extends over roughly one third of the height of the damping cup 9. In the upper two thirds the damping cup 9 is tapering, and in this area, underneath the outer wall 11, a venting channel 15 is provided which connects the first antechamber 6 with the vent 12. On the cap 10 an obliquely positioned membrane 13 can be recognised which is permeable to the ultrasound radiation thus allowing measuring of the filling level also above the damping cup. In the lower region of the damping cup 9 an inlet opening 14 can be recognised through which the liquid, in particular the oil, enters from the container into the damping cup 9.

Figure 3:
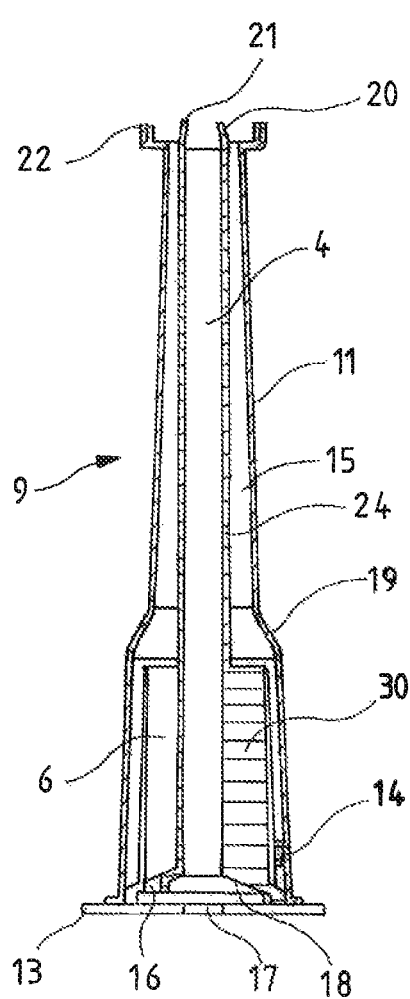
FIG. 3 shows a side view of a damping cup in section.

FIG. 3 shows the damping cup 9 in cross-section. The damping cup 9 comprises a base plate 23 having a channel 17 in the centre, which forms a connection between the second antechamber 7 not shown here and the measuring section 4. The ultrasound waves generated by the ultrasound converter 8 enter the measuring section 4 through this channel 17. An outer wall 11 positioned on the base plate 23 forms the outside of the damping cup and in its lower region comprises the inlet opening 14. The inlet opening 14 leads into the region of the first antechamber 6 in which a calming structure is formed. This is indicated here by the horizontal lines. In the calming structure 30 of the first antechamber 6 an outlet opening 16 is provided which forms a connection between the first antechamber 6 and the second antechamber 7, which is arranged underneath the base plate 23 and is not shown here. The measuring section 4 rises from the bottom shaped as a truncated cone 18 which, starting as an inclined flank, changes to become the measuring section 4. The truncated cone shape prevents air bubbles from gaining a hold here thus ensuring continuous operation of the device 1. The truncated cone 18 is interrupted in one place only, i.e. it comprises a recess at the point where the outlet opening 16 passes downwards through the truncated cone 18 to the second antechamber. The first antechamber 16 comprising the calming structure 30 is arranged on the truncated cone 18. The calming structure extends over approx. 20% to 40% of the height, of the damping cup 9. In the end region, i.e. in the upper end region of the first antechamber 6, the damping cup 9 tapers. At a transition 19 the outer wall 11 tapers with two opposing roundings and extends upwards. Inside the wall 11 is the measuring section 4 which is terminated by an inner wall 24. Between the inner wall 24 and the outer wall 11 there remains a region above the first antechamber 6, which is annular in cross-section, or which is an annular gap extending downwards from the top, and which forms the venting channel 15. This venting channel 15 extends as far as the upper end region of the damping cup 9. The end region 20 of the measuring section 4 is formed in a tapering manner. The inner wall 24 in this upper region which lies in the vicinity of the cap 10 is inclined towards the inside. The outer wall 11 in this upper region comprises an overhang 22 serving to receive the cap 10.

Figure 4:
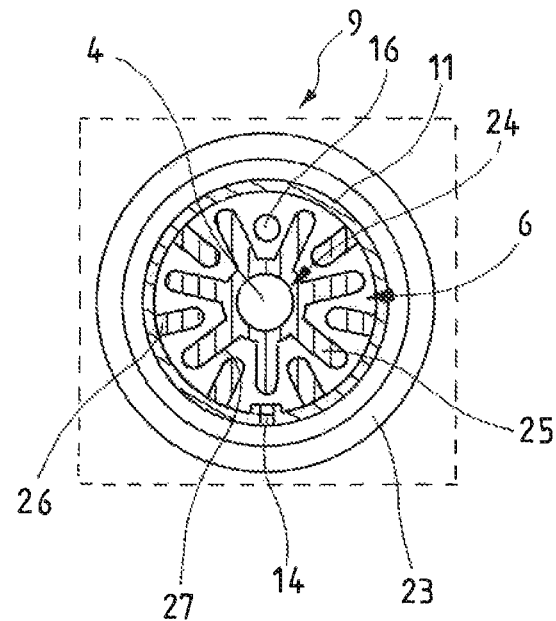
FIG. 4 shows a top view of the damping cup in the region of the first antechamber in section.

FIG. 4 shows a top view of the lower part of the damping cup 9 in section. The top view shows in particular the base plate 23 also called a flange. This is shaped in a circular manner. The outer wall 11 contains the inlet opening 14 through which the liquid, in particular the oil, enters into the antechamber 6 with the calming structure 30. The calming structure 30 here is formed as a star-shaped region 27 with a total of seven outward-pointing fingers 25. These extend starting from the inner wall 24 which surrounds the measuring section 4. Projections 26 extend from the outside into the spaces between these fingers 25. A meandering path is thus created around, the fingers 25 and the projections 26, which the liquid must take on its way from the inlet opening 14 to the exactly opposite outlet opening 16. The meander structure thus created works in the opposite direction resulting in the entire volume acting as a calming section and ensuring that the rising filling pressure can uniformly drive the light air bubbles upwards. The inlet opening 14, as regards the liquid exchange, does not have a preferred direction. When the liquid level is dropping therefore, liquid, in particular oil from the damping cup 9, returns again through the inlet opening 14 into the container 2.

Figure 5:
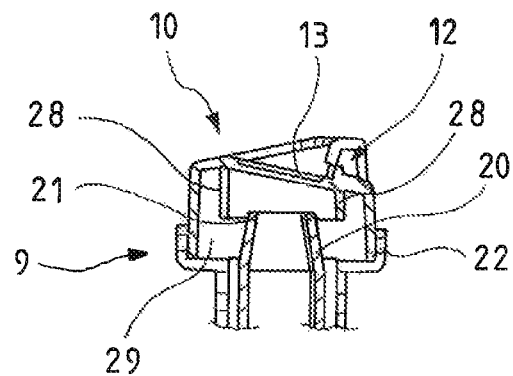
FIG. 5 shows a side view of the upper region of the damping cup with the cap, in section.

FIG. 5 following on from FIG. 3 finally shows a cross-section through the cap 10 and the upper region of the damping cup 9. The upper end region 20 of the wall 24 tapers upwards and extends as far as the region of the cap 10. The cap 10 has the vent 12 arranged in it, through which gas from the measuring section 4 and the calming structure 30 can escape upwards. When the oil level rises there exists, however, the danger that oil foam enters the cap 10 through the vent 12 and thus enters the damping cup 9 and the measuring section 4. This is undesirable. To this end a circumferential annular shield 28 is provided in the cap 10 which shield extends downwards from, the upper region of the cap 10. The lower end of the annular shield 28 ends below the upper termination 21 of the upper end region 20 of the wall 11. This ensures that oil foam entering through the vent 12 is initially directed by the shield 28 into the receiving space 29 below it. Before this now rises up the inside of the upper end region 20 of the measuring section 4 and reaches the measuring section 4, this oil foam can also enter the venting channel 15 and be received there. In this way entrance into the measuring section 4 is prevented.

All features described above and in the claim can be randomly and selectively combined with the features of the independent claim. Disclosure of the invention is thus not restricted to the described and claimed feature combinations, rather all feature combinations meaningful in terms of the invention are considered to have been disclosed.

The invention claimed is:

1. A device for determining a filling level in a container, the device comprising:
    a damping cup;
    a measuring section extending vertically inside the damping cup;
    an ultrasound converter arranged at its a lower end region of the measuring section; and
    at least one antechamber,
    wherein a calming structure is arranged in at least a part of the at least one antechamber,
    wherein the part of the antechamber comprising the calming structure is designed to be completely open towards the top and is connected, via a venting channel, with a vent in the upper region of the device,
    wherein the first antechamber surrounds the measuring section like a ring,
    wherein the venting channel surrounds the measuring section above the first antechamber like a ring, in cross-section,
    wherein an upper end region of a wall of the measuring section tapers inwards inside a detachable cap and is inclined towards the inside, and
    wherein the upper end region has an upper termination forming an open ring, which is oriented horizontally and without contact to other parts within the detachable cap.

2. The device according to one of claim 1, wherein the antechamber comprises a first antechamber and an inlet opening, and comprises a second antechamber which is connected with the first antechamber and the measuring section.

3. The device according to claim 2, wherein an inlet opening is present on one side, and an outlet opening is present on the opposite side.

4. The device according to claim 1, wherein the calming structure comprises a star-shaped inner region and projections reaching from the outside into the free regions of the star-shaped inner region.

5. The device according to claim 1, wherein an upper termination of the wall of the measuring section is higher compared to a lower termination of an annular shield extending downwards from the top and separating the upper end region of the wall of the measuring section from the vent.

6. The device according to claim 5, wherein the device comprises the detachable cap in the upper region, which comprises the vent.

7. The device according to claim 5, wherein a receiving space is present below the vent, which surrounds the upper end region of the wall.

8. The device according to claim 1, wherein the measuring section is shaped like a truncated cone at its foot.

9. An engine, in particular a motor vehicle engine, comprising the device according to claim 1.

10. A motor vehicle comprising the device according to claim 1.

* * * * *